Aug. 20, 1940.  R. E. DALY ET AL  2,212,201
HEATING APPARATUS
Filed May 23, 1936   5 Sheets-Sheet 3
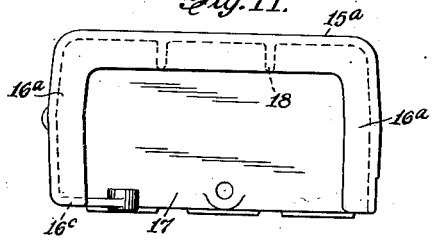
Fig. 11.
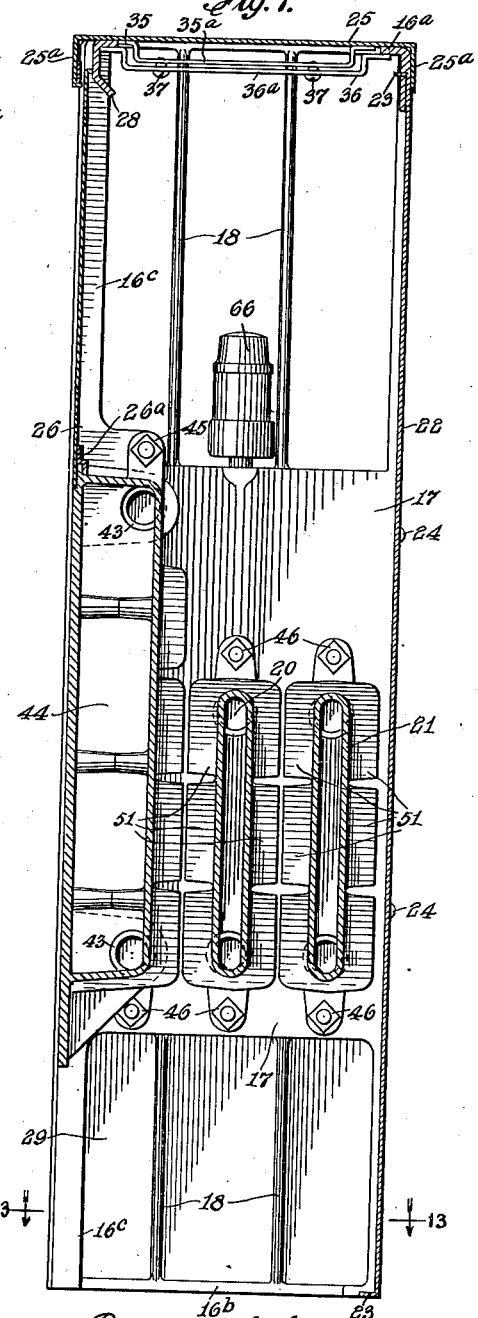
Fig. 7.
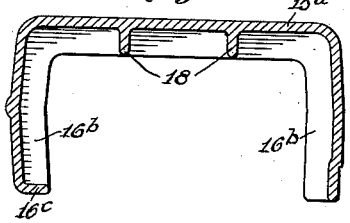
Fig. 12.
Fig. 13.
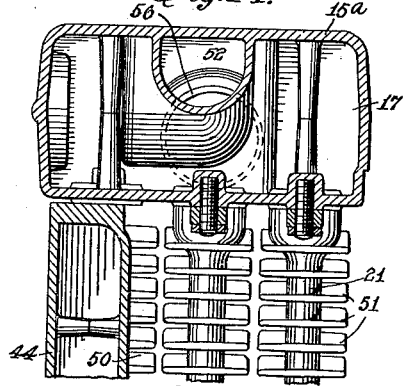
Fig. 14.
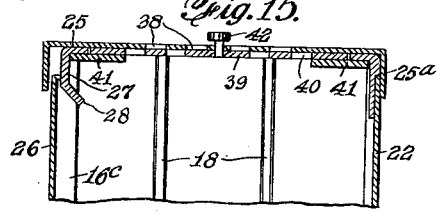
Fig. 15.
Robert E. Daly
William R. Zuhlke  INVENTORS
BY Frank C. Reynolds
Conrad A. Dreier
their ATTORNEY.

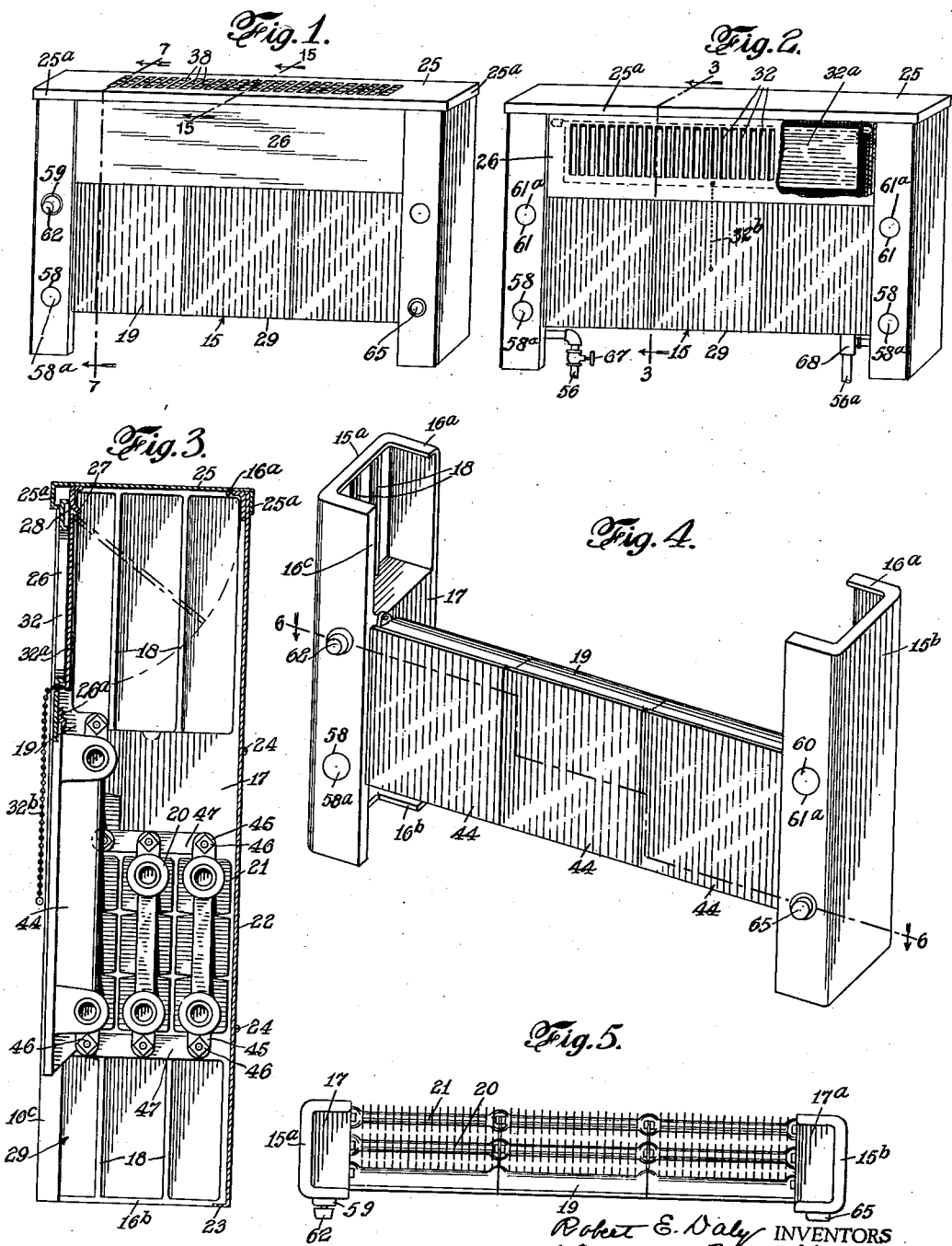

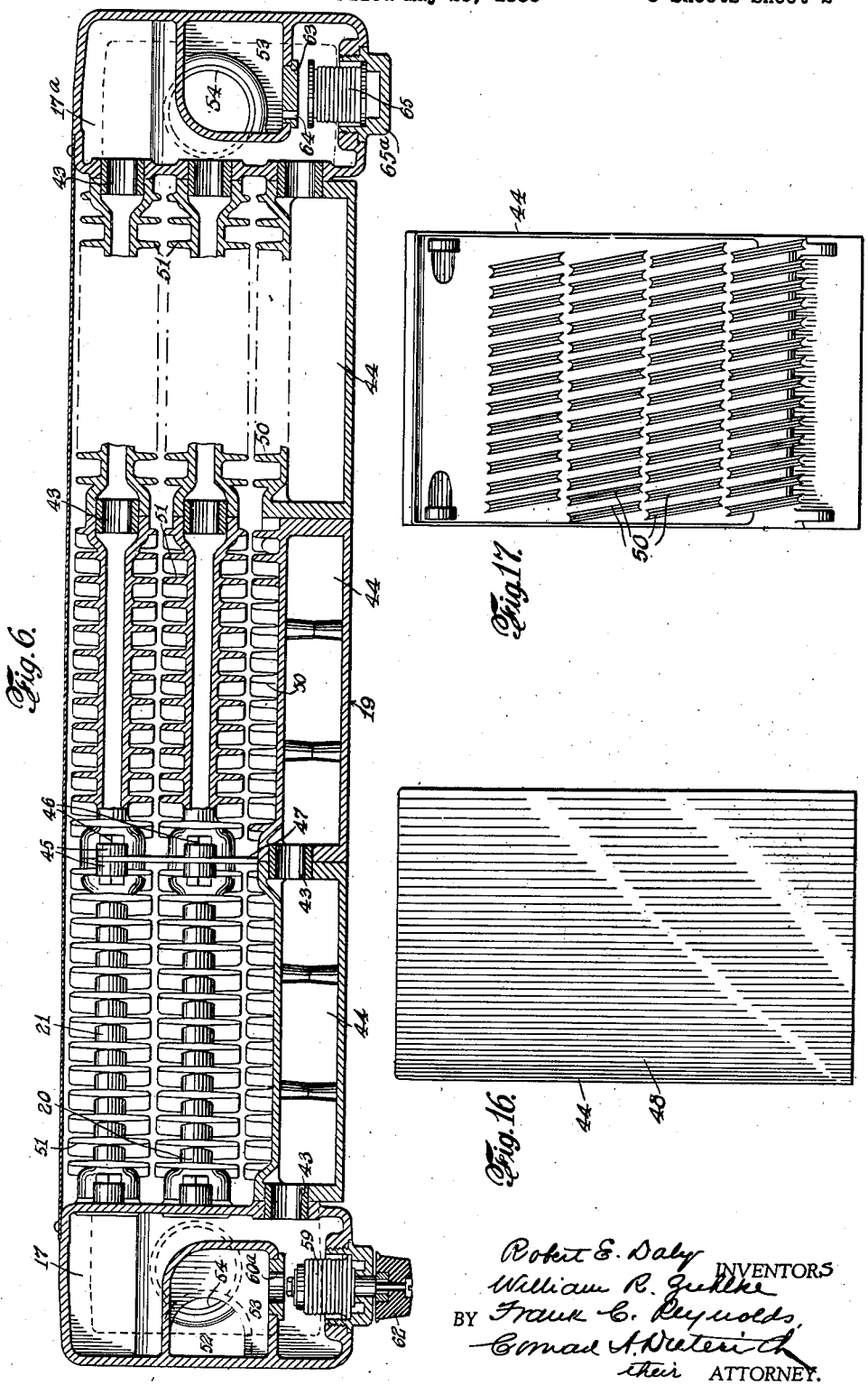

Aug. 20, 1940.   R. E. DALY ET AL   2,212,201
HEATING APPARATUS
Filed May 23, 1936   5 Sheets-Sheet 4

Robert E. Daly   INVENTORS
William R. Zuhlke
BY Frank C. Reynolds
Conrad A. Nelson
their ATTORNEY.

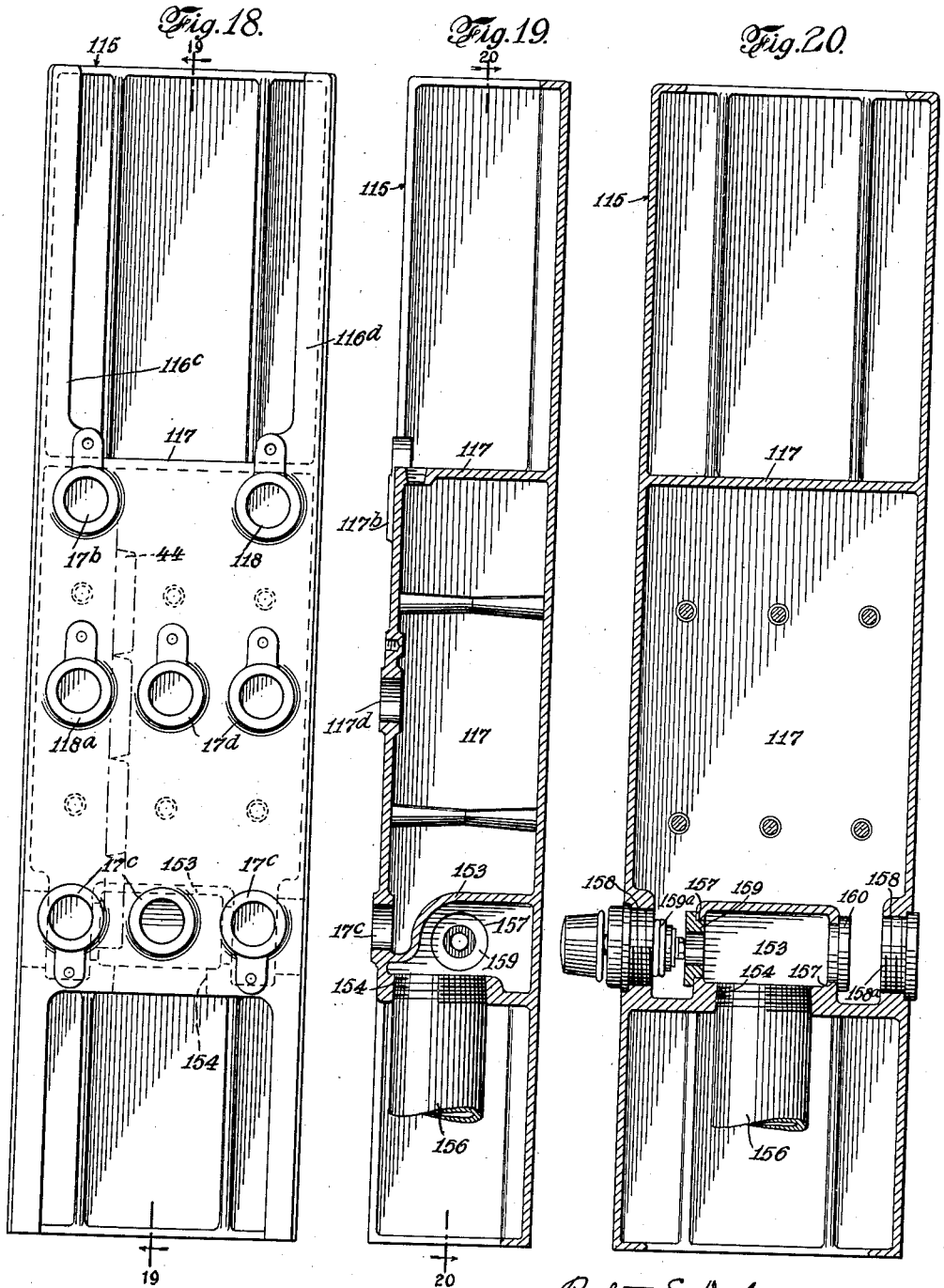

Patented Aug. 20, 1940

2,212,201

UNITED STATES PATENT OFFICE 2,212,201

HEATING APPARATUS

Robert E. Daly, New York, William R. Zuhlke, Yonkers, and Frank C. Reynolds, New York, N. Y., assignors, by mesne assignments, to American Radiator & Standard Sanitary Corporation, New York, N. Y., a corporation of Delaware Application May 23, 1936, Serial No. 81,454

9 Claims. (Cl. 257—136)

Our invention relates to improvements in heating apparatus, and the same has for its object to provide a simple, efficient and reliable heating apparatus in which the heat to heat a room or space in which the apparatus is located may be obtained by the combined action of radiation and convection, or by radiation alone, as may be desired.

Further, said invention has for its object to provide a heating apparatus having the general form of a radiator in which the room or space will be heated partly by convection and partly by radiation.

Further, said invention has for its object to provide a heating apparatus in the general form of a radiator which may be built into the wall of a room or other space, or which may be located without the wall and free therefrom.

Further, said invention has for its object to provide a heating apparatus of the character specified in which one or more heat exchange elements are disposed between and in communication with hollow headers forming part of the ends of the heating apparatus, and the front, back and top of the apparatus formed of sheet metal members cooperating with said ends or headers to form an enclosing casing for the heat exchange elements.

Further, said invention has for its object to provide a heating apparatus of the character specified including one or more heat exchange elements arranged side by side in end to end relation to form a smooth, unbroken surface forming a front wall or part of the front wall of the apparatus, and serving as a radiating or heat emitting surface.

Further, said invention has for its object to provide a heating apparatus including one or more heat exchange elements, and certain thereof having their front portions arranged in end to end relation, and the rear lower portion thereof provided with extended surface members cooperating with the extended surface members of adjacent additional heat exchange elements disposed to the rear of said first-named heat exchange elements.

Further, said invention has for its object to provide a heating apparatus of the character specified in which the end members or sections of the apparatus are reversible so as to permit of the same being used either as right or left hand ends.

Further, said invention has for its object to provide a heating apparatus in which the pipe or pipes for conducting the heating medium to and from the apparatus and the valves and accessories therfor may be arranged wholly within the geometrical outlines of the apparatus, or externally thereof, as may be found convenient or desirable.

Further, said invention has for its object to provide a heating apparatus of the character specified in which one or more horizontal cast metal heat exchange elements are arranged in rows one behind the other and connected at their ends to cast metal headers forming part of the ends of the heating apparatus, and in which the front portions of the outer row of heat exchange elements serve to form wholly or partly the front wall of the apparatus.

Other objects will in part be obvious, and in part be pointed out hereinafter.

To the attainment of the aforesaid objects and ends our invention consists in the novel features of construction, and in the combination, connection and arrangement of parts hereinafter more fully described and then pointed out in the claims.

In the accompanying drawings—

Figure 1 is a perspective view showing one form of apparatus constructed according to and embodying our said invention;

Fig. 2 is a similar view partly broken out illustrating a modified form of casing;

Fig. 3 is a transverse section on the line 3—3 of Fig. 2;

Fig. 4 is a perspective view showing the operative heating elements apart from its enclosing casing parts;

Fig. 5 is a top view of the parts shown in perspective at Fig. 4;

Fig. 6 is an enlarged horizontal section on about the line 6—6 of Fig. 4;

Fig. 7 is a vertical section on the line 7—7 of Fig. 1;

Fig. 11 is a top view of the end members as shown at Fig. 8;

Fig. 12 is a transverse section of the end member on the line 12—12 of Fig. 8;

Fig. 13 is a transverse section on the line 13—13 of Fig. 7;

Fig. 14 is a detail horizontal section on the line 14—14 of Fig. 8;

Fig. 15 is a transverse section on the line 15—15 of Fig. 1;

Figs. 16 and 17 are front and rear views, respectively, of an intermediate radiator section;

Fig. 18 is an inside face view of a modification illustrating a reversible member;

Fig. 19 is a vertical section on the line 19—19 of Fig. 18, and

Fig. 20 is a tranverse section on the line 20—20 of Fig. 19.

Figure 8:
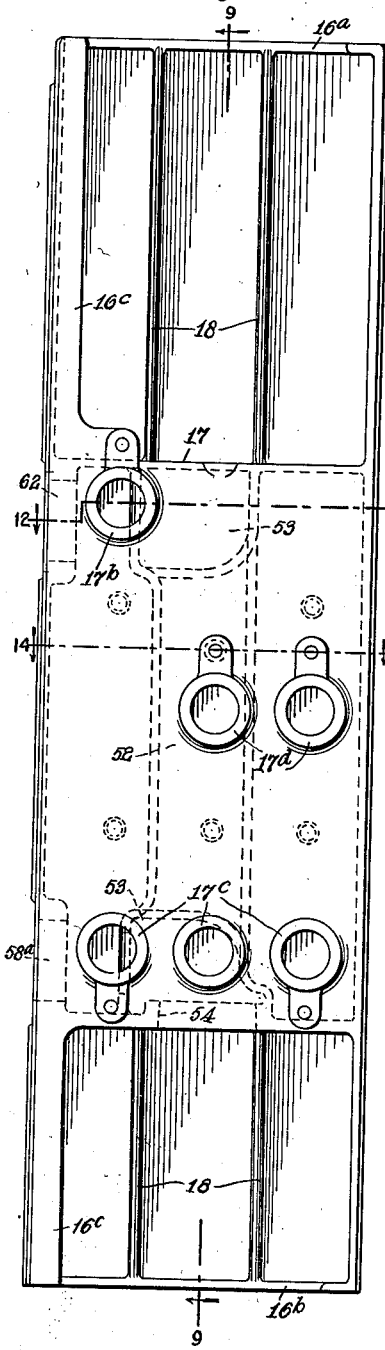
Fig. 8 is an inside face view of one of the end members of the apparatus.

In said drawings 15 designates the apparatus as a whole comprising end sections 15a, 15b formed of cast metal of substantially U-shape in cross-section and open at their upper and lower ends. Each end section is provided at its upper and lower ends with short, inwardly extending flanges 16a, 16b, and along its front edge with a similar flange 16c. The end sections 15a, 15b are each further provided upon their inner sides about midway of their height with shallow header portions 17, 17a formed integrally with their respective end sections 15a, 15b. Each header portion 17, 17a occupies about one third of the height, and is coextensive in width and depth with the interior of its end section, and the inner side of each end section, above and below the header, is provided with a plurality of integral, vertical reinforcing ribs 18. The inner faces of said headers are provided at their upper forward portions with a nipple hub 17b, adjacent their lower portions with three similar nipple hubs 17c, and near their middle portions with two similar nipple hubs 17d. The end sections 15a, 15b are secured together at their header portions 17, 17a by a plurality of rows of connected intermediate heat exchange or radiator sections 19, 20, 21. The radiator sections are secured together in end to end relation and the ends of the rows secured to the nipple hubs 17b, 17c, 17d by nipples 43, as hereinafter more fully described.

The end sections 15a, 15b serve also as the end members of an enclosing casing which includes a sheet metal back 22 coextensive in height with the end sections 15a, 15b, and having inturned flanges 23 at its upper and lower horizontal edges, and secured along its vertical edges by screws 24 to the recessed rear edges of said end sections 15a, 15b. The enclosing casing also includes a sheet metal cover or top 25 having a depending flange 25a along its edges, and a front or panel 26 having its upper horizontal edge disposed intermediate a depending flange 27 on the underside of the cover 25, and an inturned edge on said depending flange 25a of the cover 25. The depending flange 27 has an inwardly and upwardly inclined end portion 28 which serves as cam means for guiding the upper edge of the front 26 into position. The lower horizontal edge of the front 26 terminates about on a line with the upper edge of the front row 19 of the connected radiator sections, and is provided with one or more inwardly and downwardly extending members 26a adapted to engage the upper edge of said front row 19 of radiator sections to support said front 26 in position. The space below said front row 19 of radiator sections, and between the end sections 15a, 15b forms an air intake opening 29 through which the air to be heated by the rows of radiator sections 19, 20, 21 is received.

The front 26 is provided at or near its upper portion with a series of vertical air outlet openings 32 (see Fig. 2) controllable by a hinged damper or plate 32a pivotally secured at its upper edge to the inner or rear side of the front 26. The said damper is maintained normally in open or raised position by suitable spring means at its hinged portion, and is provided at its free edge with a flexible operating member or chain 32b extending through said front for actuating said damper or plate. The front 26 is disposed in a vertical plane coinciding with that of the front wall of the front row 19 of radiator sections and forms therewith a smooth, unbroken front wall for the apparatus.

Instead of providing the casing with air outlet openings 32 in its front 26, as shown at Fig. 2, the cover 25 may be provided with outlet openings 38, preferably in the form of a grille, as shown at Figs. 1 and 15, controllable by a sliding plate 39 having openings 40 registering with the openings 38 in the cover 25. The sliding plate 39 is supported by, and works in longitudinal guides 41 provided upon the underside of the cover 25, and has an operating knob 42 extending through a slot in the cover 25 for actuating said plate.

The cover is provided upon its underside adjacent the opposite ends with straps 35 each having a depressed intermediate portion 35a and secured at its ends to the underside of said cover. A similar strap 36 having a depressed intermediate portion 36a registering generally with that of the strap 35 is secured thereto by screws 37 with its ends engaging the underside of the upper flanges 16a of the end sections 15a, 15b whereby to hold said cover firmly secured to the apparatus.

The group of heat exchange sections or elements disposed intermediate the end sections 15a, 15b comprises three horizontal rows of radiator sections 19, 20, 21 arranged one behind the other. Each row consists of three similar sections connected at their adjacent ends by nipples 43, and each section is provided with lugs 45 at its opposite ends which are drilled to receive bolts 46. The bolts 46 also pass through registering holes in the spacing members or straps 47 for securing said sections 19, 20, 21 in duly assembled relation and to the inner sides of the header portions 17 and 17a. The sections 44 of the forward or outer row 19 have flat rectangular front portions 48 arranged in end to end relation and forming a substantially smooth, unbroken exposed front wall. The rear sides of said front sections are provided with inclined ribs 50 forming extended surface members or fins.

The intermediate and rearmost sections 21, 20, are all of the same size and shape, and provided with registering inclined fins or extended surface members 51 upon their four sides. The said elements 19, 20, 21 are of such number and size that when properly assembled and secured to the ends 15a, 15b they will substantially equal the transverse area of the end section enclosing the same so that all the air entering at the base of the casing at the opening 29 will be forced through the spaces between said radiator sections and over the inclined fins or extended surface members 50, 51 thereof, and thereby become heated, rise and issue through the outlets 32 in the upper part of the casing or enclosure, or the outlets 38 in the cover 25, as the case may be.

The header portion 17, 17a of each end member 15a, 15b is provided upon its inner side with an integrally formed vertical, semi-circular channel portion 52 which extends from the top to the bottom wall of the header where it merges with the upper and lower enlarged valve chamber portions 53. Each end section 15a, 15b is provided at the base of its header 17 with a threaded aperture 54 which communicates with the interior of the lower chamber portion 53 in which is secured one end of a supply pipe or riser 56 communicating at its other end with a source of fluid heating medium. The corresponding threaded aperture 54 of the end section 15b is connected to the return pipe 56a. The lower chamber portion 53 of said left hand end section 15b is further provided at its front portion or wall, and within its header 17, with an aperture 57 which is sealed by a plug 57a. The said aperture 57 registers with a screw-threaded opening 58 in the front of the end section 15a which is sealed by a flush screw plug 58a. The said opening 58 is under certain conditions designed to receive the valve 59 to control the supply of heating fluid, but ordinarily the said aperture 58 is sealed with a screw plug 58a. The upper chamber 53 is similarly provided in its front portion or wall with an aperture 60, which registers with a screw-threaded aperture 61 in the front wall of the end section 15a. The aperture 60 is provided with a bushing 60a whose outer end serves as a valve seat for the valve 59, secured in the screw-threaded aperture 61, with its operating wheel 62 extending outwardly from the end section. The valve 59 serves to control the supply of heating fluid to the interior of the header 17, and to the radiator elements 19, 20, 21 communicating at their ends with said headers.

When the left hand end 15a of the apparatus has its upper opening 61 equipped with a valve 59, and its lower opening 58 sealed with a plug 58a, the right hand end 15b has its upper opening 61 sealed with a plug 61a, and its lower opening 58 provided with a thermostatic valve 65 carried by a screw-plug 65a. The face of said thermostatic valve is adapted to seat against the front of a plug 63 secured in the front wall of the lower chamber 53 and seal the drain aperture 64 therein whereby to control the return of condensation or cold water to the boiler.

It will, of course, be understood that each end section 15a, 15b is provided in its front wall with two apertures which may be sealed by removable screw plugs 58a, 61a, and that the apertures 57 in the front wall of the chamber portions 53 of the channel members 52 may have their registering, and for the time being inoperative, openings sealed by removable plugs 57a. This arrangement permits of the ready application of necessary valves and accessories to either end section in order to adapt the apparatus for use in connection with a "one pipe" or "two pipe" steam system or a hot water system.

One of the headers 17 may be provided in its upper end with a suitable aperture to receive an air relief valve 66.

In the modification illustrated at Fig. 2, the valve 67 and trap 68 controlling the supply of heating fluid to and from the boiler are shown as located in the supply pipe 56 and the return pipe 56a at points below the bottom wall of their respective headers 17, 17a, while in the main construction illustrated in the remaining figures the said valves are located within their respective headers.

Figure 9:
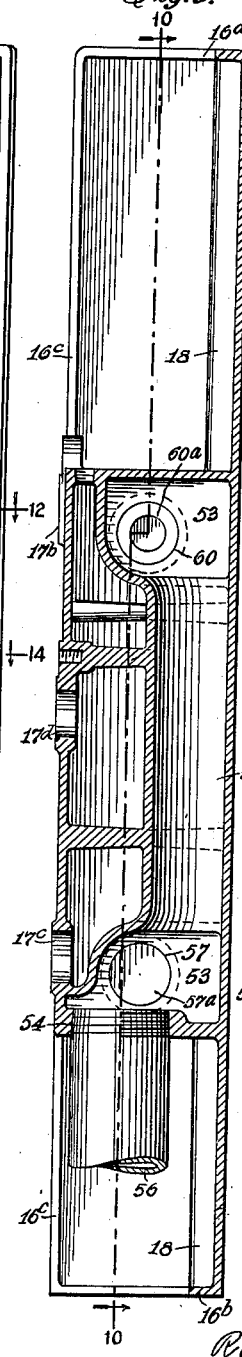
Fig. 9 is a vertical section of the same on the line 9—9 of Fig. 8.
Figure 10:
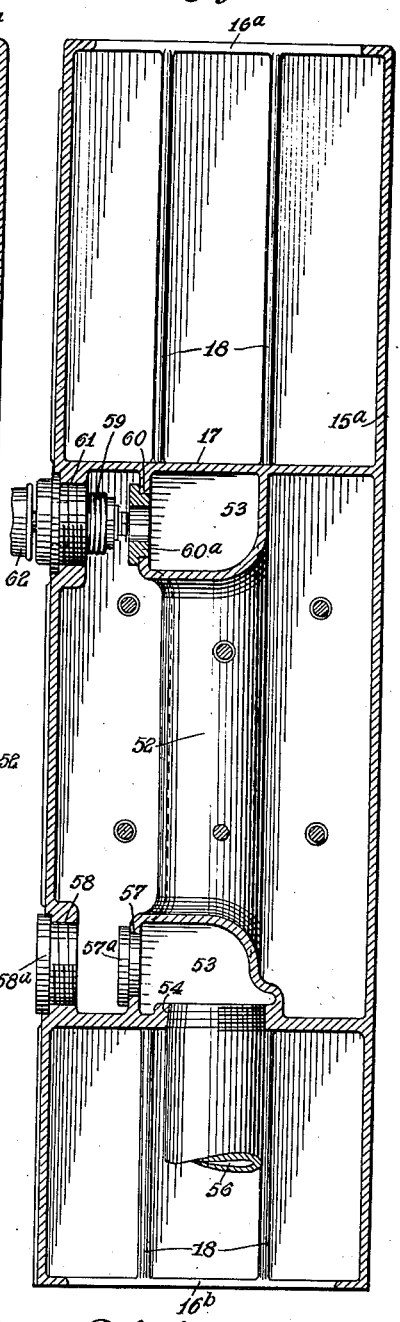
Fig. 10 is a vertical section on the line 10—10 of Fig. 9.

Figs. 18, 19 and 20 illustrate a modified form of end member which is designed to be reversible in order that the same may be used either as a right or left end section or member of an apparatus. In this modification the end member 115 is constructed essentially the same as that of the main construction illustrated at Figs. 8, 9 and 10. It differs, however, therefrom in that the end member 115 in the present instance is provided along its rear vertical edge with an inwardly extending flange 16d corresponding to the inwardly extending flange 116c at the front edge of the member. The header 117 differs from that of the main construction in that the channel member 52 is omitted, and in place thereof a relatively low chamber portion 153 is provided within the header 117 at the base thereof communicating at its bottom with the intake opening 154 in the base of the header to which is connected one end of a supply pipe or riser 156 communicating with a source of heating fluid. Each of the vertical end walls of the compartment or chamber portion 153 is provided with an aperture 157 which is aligned with the other, and with openings 158 provided in the front and rear wall portions of the end member 115. The apertures 157 in the chamber compartment are adapted to receive a bushing 159 whose outer portion serves as a valve seat against which a valve 159a, located in the adjacent opening in the wall of the end member, is adapted to seat. The aperture 157 in the end wall of the compartment 153 opposite to the one serving as a valve seat is normally sealed by a screw plug 160, or, vice versa, according to whether the end member 115 is to be used as a right or a left end section of the apparatus, and the adjacent opening 158 normally sealed by a screw-plug 158a.

In order to properly accommodate the taller front row of heat exchange elements 44 the headers 117 are provided at their upper ends with an additional threaded nipple hub 118, and at their intermediate portion with an additional nipple hub 118a.

The operation of the apparatus will be largely obvious from the foregoing description. It need only be noted that when the supply valve is opened steam will enter the header 17 of the left-hand end section by way of the supply pipe 56, lower chamber portion 53, through the channel member 52, and pass through the upper chamber portion 53 and bushing 60, and into the header, and thence pass into and through the rows 19, 20, 21 of the radiator sections and into the header 17a of the right hand end section 15b. The heating fluid will then pass into the lower chamber portion 53 by way of the aperture 64 controlled by the trap 65, lower chamber portion 53, and into the return pipe 56a, and back to the boiler or source of heating medium supply. The passage of heating fluid through the headers 17, 17a and rows 19, 20 and 21 of the heating element will cause the same to become highly heated, and outer surfaces of the front row 19 to emit heat by radiation. At the same time, if the air outlet openings 38 in the top 25 are open cold air will be drawn into the apparatus through the opening 29 at the base thereof, pass upwardly through the apparatus, and in so passing impinge upon the surfaces and extended surfaces of the rows of radiator sections 19, 20, 21, and issue through the air outlet openings 38 in the casing top 25, and thus impart heat to the room or space to be heated by the combined action of radiation and convection. If only heat by direct radiation is desired it merely becomes necessary to close the outlet openings 38 in the top 25 by moving the slide 39 until the closed portions thereof come into register with the openings in said cover whereby the passage of heated or convected air will be arrested, and the further emission of heat confined entirely to the emission of heat by radiation from the front portions of the outermost row 19 of the radiator sections.

It is to be noted that by means of our invention we are enabled to provide a heating apparatus in which the radiating element thereof is formed essentially of cast metal while the convecting element is formed partly of sheet metal and partly by said cast metal portions, and that by so constructing the apparatus the same is made to present outwardly the appearance of a radiator of well known type enclosed within a sheet metal or other type of casing.

Further it is to be noted that by constructing the apparatus as herein shown and described it becomes possible to provide an apparatus having the outward appearance of an enclosed radiator but occupying less cubical space than a radiator of equal or lesser output which is formed as an independent structure and enclosed or surrounded by a separate casing or enclosure.

Having thus described our said invention what we claim and desire to secure by Letters Patent is:

1. A heating apparatus comprising a casing including sheet metal front and back wall members and cast metal end members, hollow headers on the inner sides of said end members formed integrally therewith and having an intake and an outlet communicating with a source of heating fluid, a channel member in said header communicating with said intake and said outlet, valve means for controlling said intake and outlet, and heat exchange members intermediate said hollow headers and communicating therewith, certain of the wall portions of said heat exchange members constituting part of the front wall of said casing.

2. A heating apparatus comprising a casing including sheet metal front and back wall members and cast metal end members, hollow headers on the inner sides of said end members formed integrally therewith and having an intake and an outlet communicating with a source of heating fluid, a channel member in said header having openings therein communicating with the interior of said headers, valve means on said headers for controlling said intake and said outlet, and heat exchange members intermediate said hollow headers and communicating therewith, certain of the wall portions of said heat exchange members having their front wall portions disposed in a vertical plane coinciding with that of the front wall member of said casing and constituting part thereof.

3. A heating apparatus comprising a casing including sheet metal front and back wall members and cast metal end members, hollow headers on the inner sides of said end members formed integrally therewith and having an intake and an outlet communicating with a source of heating fluid, a channel member in said header having openings therein communicating with the interior of said headers, openings in said end members in line with said intake and outlet, valve means disposed in said openings having valve faces controlling said intake and outlet, and heat exchange members intermediate said hollow headers and communicating therewith, certain of the wall portions of said heat exchange members constituting part of the front wall of said casing.

4. A heating apparatus comprising a casing including sheet metal front and back wall members and cast metal end members, hollow headers on the inner sides of said end members formed integrally therewith and having an intake and an outlet communicating with a source of heating fluid supply, a channel member in said header and formed integrally therewith, said headers each having an intake opening in its base communicating with its respective channel member, outlets in the opposite end of said channel member communicating with the interior of the header, openings in each of said end members in line with the outlets in said headers, means for sealing certain of said openings, and valve means disposed in the other of said openings for controlling said intake and said outlet, and heat exchange members intermediate said hollow headers and communicating therewith, certain of the wall portions of said heat exchange members constituting part of the front wall of said casing.

5. A heating apparatus comprising a casing including sheet metal top, front and back wall members and cast metal end members, hollow headers on the inner sides of said end members formed integrally therewith and communicating with a source of heating fluid supply, and a plurality of series of heat exchange members arranged in parallel one behind the other intermediate said hollow headers and communicating at their opposite ends therewith, the outermost of said series of heat exchange members having front wall portions substantially coextensive in height with the height of said hollow headers, and the remaining of said series of heat exchange members being of less height than said outermost series and disposed adjacent the lower edge thereof, and provided with projecting extended surface members, and extended surface members projecting from the rear of said outermost series adjacent the lower edge thereof registering with the extended surface members of the series of heat exchange members to the rear of said outermost series.

6. A heating apparatus comprising a casing including sheet metal top, front and back wall members and cast metal end members of U-shape in cross section, hollow headers on the inner sides of said end members formed integrally therewith and disposed wholly within the outlines thereof and communicating with a source of heating fluid supply, and a plurality of series of heat exchange members arranged in parallel one behind the other intermediate said hollow headers and communicating at their opposite ends therewith, the outermost of said series of heat exchange members having front wall portions substantially coextensive in height with the height of said hollow headers, and the remaining of said series of heat exchange members being of less height than said outermost series and disposed adjacent the lower edge thereof, and provided with projecting extended surface members, and extended surface members projecting from the rear of said outermost series adjacent the lower edge thereof registering with the extended surface members of the series of heat exchange members to the rear of said outermost series.

7. A heating apparatus comprising a casing including front and back wall members and cast metal end members, hollow headers on the inner sides of said end members formed integrally therewith and having an intake and an outlet communicating with a source of heating fluid, a compartment in each header communicating with its respective intake and having an outlet communicating with the interior of said header, valve means for controlling said outlet, and heat exchange members intermediate said hollow headers and communicating therewith.

8. A heating apparatus comprising a casing including front and back wall members and cast metal end members, hollow headers on the inner sides of said end members formed integrally therewith and having an intake and an outlet communicating with a source of heating fluid, a compartment in each header communicating with its respective intake and having an outlet communicating with the interior of said header, valve means for controlling said outlet, and heat exchange members intermediate said hollow headers and communicating therewith, certain of the wall portions of said heat exchange members constituting part of the front wall of said casing.

9. A heating apparatus comprising a casing including front and back wall members and cast metal end members, apertures in said end members, and hollow headers on the inner sides of said end members formed integrally therewith and having intake and outlet openings communicating with a source of heating fluid, a compartment in each header communicating with the intake opening in its respective header, outlets in the opposite sides of said compartment in line with the apertures in said end members and communicating with the interior of said headers, means for sealing certain of said outlets, and valve means for controlling other of said outlets.

ROBERT E. DALY.
WILLIAM R. ZUHLKE.
FRANK C. REYNOLDS.